(12) United States Patent
Koyama et al.

(10) Patent No.: US 7,197,951 B2
(45) Date of Patent: Apr. 3, 2007

(54) MULTI-RESOLVER ROTATION ANGLE SENSOR WITH INTEGRATED HOUSING

(75) Inventors: Toshisada Koyama, Miyota-Machi (JP); Mutsumi Matsuura, Tokyo (JP); Takashi Sano, Tokyo (JP); Yoshihito Osanai, Miyota-Machi (JP)

(73) Assignee: Minebea Co., Ltd., Nagano-ken (JP)

( * ) Notice: Subject to any disclaimer, the term of this patent is extended or adjusted under 35 U.S.C. 154(b) by 63 days.

(21) Appl. No.: 10/897,439

(22) Filed: Jul. 23, 2004

(65) Prior Publication Data

US 2005/0034545 A1    Feb. 17, 2005

(30) Foreign Application Priority Data

Jul. 25, 2003   (JP) .............................. 2003-201485

(51) Int. Cl.
  *G01B 7/30*   (2006.01)
(52) U.S. Cl. ................ 73/865.9; 73/866.1; 324/207.25
(58) Field of Classification Search ............... 73/865.9, 73/865.1; 324/207.25
See application file for complete search history.

(56) References Cited

U.S. PATENT DOCUMENTS

| | | |
|---|---|---|
| 3,495,109 A | 2/1970 | Ames |
| 5,012,169 A | 4/1991 | Ono et al. |
| 5,895,994 A | 4/1999 | Molnar et al. |
| 6,260,422 B1 | 7/2001 | Odachi et al. |
| 6,484,592 B2 | 11/2002 | Sezaki |

FOREIGN PATENT DOCUMENTS

| | | |
|---|---|---|
| EP | 1 298 032 | 4/2003 |
| EP | 1 325 858 | 7/2003 |
| JP | A-63-039449 | 2/1988 |
| JP | A-04-047218 | 2/1992 |
| JP | A-05-168216 | 7/1993 |
| JP | A-05-316676 | 11/1993 |
| JP | A-06-038429 | 2/1994 |
| JP | A-06-169541 | 6/1994 |
| JP | A-07-318368 | 12/1995 |
| JP | A-10-170357 | 6/1998 |
| JP | 2002-2817016 | 9/2002 |

OTHER PUBLICATIONS

Office Communication from European Patent Office issued on Mar. 15, 2006 for a counterpart European application No. 04017600.0-2213.
Office Communication from European Patent Office issued on Dec. 12, 2005 for a counterpart European application No. 04017600.0-2213.

*Primary Examiner*—Daniel S. Larkin
(74) *Attorney, Agent, or Firm*—Adduci, Mastriani & Schaumberg, L.L.P.

(57) ABSTRACT

A rotation angle sensor includes: (a) a multi-resolver housing with a high precision structure; (b) stator terminals that do not cause deformation or loosening of terminal pins from the substrates to which they are attached; and (3) a signal line connection structure that is not affected by thermal stress. The housing (10) includes divisional housings (10a, 10b), and one resolver is installed in each of the divisional housings (10a, 10b). The divisional housings (10a, 10b) are assembled by aligning respective openings therein in an axial direction. The lead lines of stator windings are connected to printed circuit substrates (51) installed on insulators (20a, 20b), and pins (54) connect the printed circuit substrates (51) to a connecting signal output line via flexible connectors (61, 64).

17 Claims, 6 Drawing Sheets

-PRIOR ART-

FIG. 5

-PRIOR ART-

FIG. 6

-PRIOR ART-

FIG. 7A

-PRIOR ART-

FIG. 7B

-PRIOR ART-

FIG. 7C

MULTI-RESOLVER ROTATION ANGLE SENSOR WITH INTEGRATED HOUSING

CROSS REFERENCE TO RELATED APPLICATION

This application is based on and incorporates by reference Japanese Patent Application No. 2003-201485, which was filed on Jul. 25, 2003.

BACKGROUND OF THE INVENTION

The present invention relates to a rotation angle sensor incorporating at least two resolvers, and in particular to a rotation angle sensor that detects the amount of relative rotation of an input axle and an output axle of, for example, an automobile power steering device that manipulate a steering device torsion bar as a result of their relative rotation.

A rotation angle sensor may be used in conjunction with a power steering device to detect a relative turning angle of an automobile steering wheel for steering control-related applications. Specifically, the sensor detects the amount of relative rotation of an input axle and an output axle arranged on the steering device torsion bar when resolvers respectively rotate the input axle and the output axle.

Figure 5:
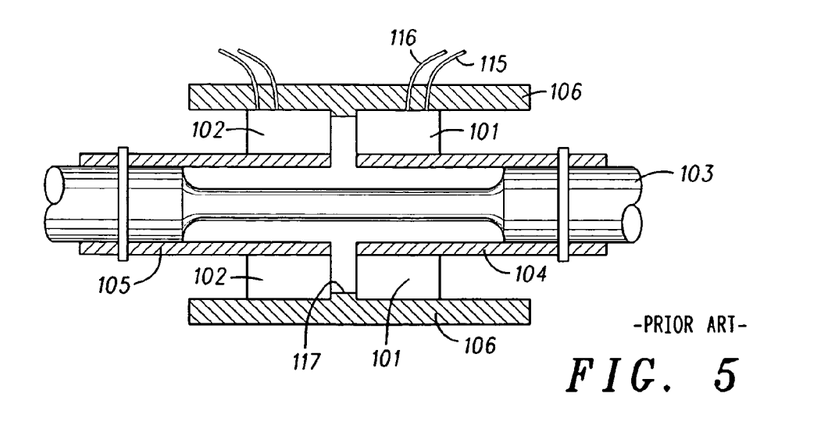
FIG. 5 is a cross-sectional view of a prior art rotation angle sensor.
Figure 6:
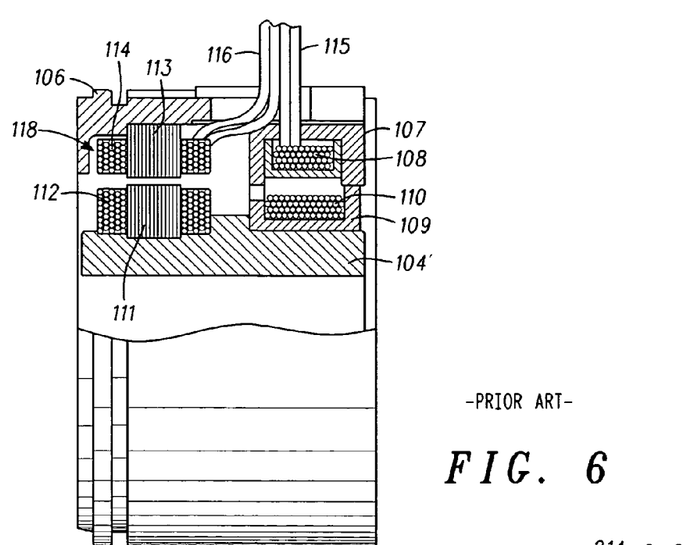
FIG. 6 is a partial cross-sectional view of a resolver used in the prior art rotation angle sensor of FIG. 5.

As shown in FIG. 5, a first resolver 101 in a conventional rotation angle sensor secures one end of a torsion bar 103 to the input axle (not shown), a second resolver 102 secures the other end to the output axle (not shown). When the power steering device (not shown) causes the input axle and the output axle to rotate, the torsion bar 103 is twisted, and the resolvers 101, 102 detect the amount of relative rotation of the input and output axles.

An input side cylindrical rotor 104 is fastened on the input axle side of the torsion bar 103, and an output side cylindrical rotor 105 is fastened on the output axle side. In addition, a housing 106 surrounds the circumference of both rotors 104, 105 as well as both stators (an exemplary stator 118 is shown in FIG. 6).

As shown in FIG. 6, the input side resolver 101 includes a first magnetic circuit with a ring-shaped first yoke 107 that is provided in the inner circumference of the housing 106 and a first coil 108 that is provided inside the first yoke 107. Furthermore, the first magnetic circuit also includes a ring-shaped second yoke 109 that faces the first yoke 107 and that is fastened on the outer circumference of the input side cylindrical rotor 104, and a second coil 110 that is provided within the ring-shaped second yoke 109.

The input side cylindrical rotor 104 also includes a third yoke 111 that is fastened on the circumference thereof, and a third coil 112 that is connected to the second coil 110 on the circumference of the third yoke 111, and that has two types of coils with respective phases shifted by 90°. The stator 118, which is provided on the inner circumference of the housing 106, includes a fourth yoke 113 and a fourth coil 114 that respectively face the third yoke 111 and third coil 112 of the input side cylindrical rotor 104. Similar to the third coil 112, the fourth coil 114 has two types of coils with respective phases shifted by 90°. Lead lines 115, which are connected to the first coil 108, and lead lines 116, which are connected to the fourth coil 114 of the stator 118, extend externally from the housing 106.

The output side resolver 102, which has the same structure as the above described input side resolver 101, is provided between the output side cylindrical rotor 105 and the housing 106.

Referring again to FIG. 5, the step 117 at the center portion of the rotation angle sensor in FIG. 5 spaces the resolvers 101, 102 apart from one another and acts as a stopper to limit the amount that the resolvers can be moved inwardly in an axial direction toward one another. Both of the lateral sides of the step 117 actually maintain the resolvers 101, 102 in their respective positions as shown.

Although the torsion angle of the torsion bar 103 is relatively small, the torsion bar 103 nonetheless rotates while in a torqued state. Therefore, the resolvers 101, 102 that are connected thereto are required to have a high detection precision relative to the entire circumference of the torsion bar 103. However, it has been difficult to realize such a high level of detection precision over the entire circumference of the torsion bar 103 with conventional rotation angle sensors.

The above-mentioned conventional rotation angle sensor has additional limitations. For example, it is difficult to manufacture, and it is difficult to connect the lead lines 115, 116 of the rotor and stator coils, such as the coils on which the detection signals are output to a processing control device (not shown). In addition, it is difficult to align the two resolvers 101, 102 in the housing 106, and to manufacture the housing 106 with the amount of precision that is required for the above application. Furthermore, whether the rotation angle sensor is non-defective or defective can be determined only after both resolvers 101, 102 are arranged in the stator 118.

Figures 7A, 7B:
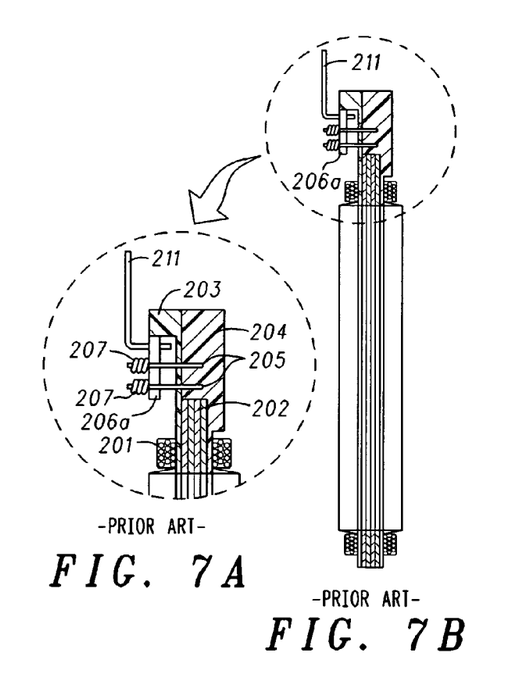
FIG. 7A is an explanatory view of a stator terminal and the corresponding connecting configuration for connecting the stator terminal to external signal output lines in a prior art rotation angle sensor.
FIG. 7B more specifically illustrates the connecting configuration of the stator terminal of FIG. 7A.

In response to the above-mentioned limitations, resolver configurations such as the one shown in FIG. 7A provide first and second resin insulation caps 203, 204 on a ring-shaped steel core, or stator stack, 202 that includes stator windings 201. The term "axial direction" will refer to the lengthwise direction of a rotation shaft extending through the resolver.

The pins 205 project from the first insulation cap 203 and the printed circuit substrate 206a, which are arranged in parallel with, and on one side of, the second cap 204. The pins 205 are implanted by impact or insert molding into the second insulation cap 204. On each of these pins 205, the stator windings 201 are connected by the winding hook 207. The tip of each of the pins 205 and the wiring pattern of the printed circuit substrate 206a are connected by soldering. Therefore, the printed circuit substrate 206a is fastened to the stator windings 201 by the pins 205 so that it extends outwardly in the axial direction from the first insulation cap 203 in a floating manner. The wiring pattern of the printed circuit substrate 206a is connected to external signal output lines (not shown).

The first and second insulation caps 203, 204 are directly provided on the stator stack 202, and therefore are directly affected by heat generated by the stator 201. Further, the exemplary stator 201 in FIG. 7A is only a single stator. Therefore, if two stators such as the one shown in FIG. 7A are required, the stators have to be provided in parallel to conform to a housing such as the one shown in FIG. 5. In the single stator example of FIG. 7A, the end of the stator windings are hooked on the pins 205 provided on the circuit substrate 206a, and the pins 205 are wired to the external signal output lines 214 (FIG. 7C) through the printed circuit substrate 206a. Therefore, if two stators are implemented together, the stators must be connected to the external signal output lines 214 in a manner such as that shown in FIGS. 7B and 7C.

Figure 7C:
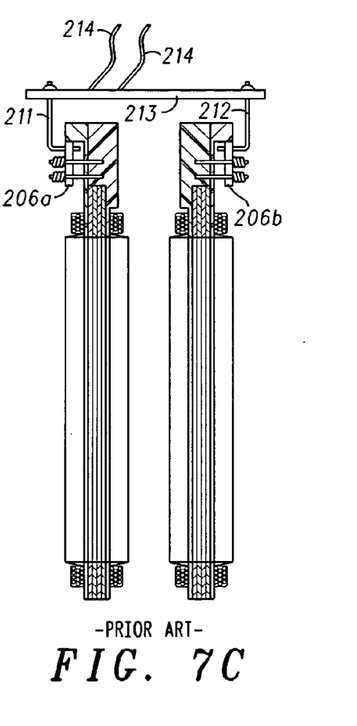
FIG. 7C shows two stator terminals and corresponding connecting configurations for connecting the stator terminals to external signal output lines in a prior art rotation angle sensor.

Specifically, the circuit substrate 206a, which is a signal relaying substrate for a first of the two stators 201, includes an L-shaped pin 211 soldered to a connecting substrate 213, which in turn is connected to the signal lines 214. Similarly, the circuit substrate 206b, which is the signal relaying substrate for a second of the two stators 201, includes an L-shaped pin 212 also soldered to the connecting substrate 213.

The housings required for the resolvers shown in FIGS. 5 and 7A–7C typically have several limitations. For example, because the housings are thin and relatively long, high production yield is difficult to achieve. In addition, inspection of the resulting rotation angle sensor for deformation caused by installation of the resolvers can be carried out only after both resolvers are installed in their respective housings. Therefore, if one of the two resolvers is defective, the other non-defective resolver is also not usable. Still further, when the two resolvers are aligned at their respective zero points within their respective housings, the resolvers have to be fastened during alignment of the two stator stacks, thereby increasing the complexity of assembly.

In addition, the hammering of the pins, such as the pins 205 in FIG. 7A, into the second insulation cap 204 often causes deformation or cracking of the insulator resin of the second insulation cap 204 or a deformation of the pins themselves. Also, as the temperature of the stator stack 202 increases, the pins 205 have a tendency to loosen from the second insulation cap 204 due to the expansion and softening of the insulation cap resin.

Still referring to FIGS. 7A–7C, because the circuit substrates 206a, 206b are formed from materials such as resin, the substrates have different thermal expansion coefficients than the pins 205. Therefore, when the circuit substrates 206a, 206b are connected to the stator windings using the pins 205, the stress due to thermal expansion and contraction that is repeatedly applied to the connecting junction tends to disconnect the pins 205 from the circuit substrates 206a, 206b.

While the floating structure of the circuit substrates 206a, 206b reduces the stress due to thermal expansion and contraction, such a structure does not completely remove the stress. In addition, alignment of the pins 205 is difficult. Therefore, to maintain the precision of the location of the pins 205, the precision of the elements and the installation precision have to be precisely controlled.

Therefore, what is needed is a multi-resolver rotation angle sensor that has a single integrated housing, an external signal output line connecting terminal that does not require terminal pins to be hammered therein, and a simplified wiring configuration that minimizes the effects of thermal stress on connection points between the resolver stator and stator wiring connections.

SUMMARY OF THE INVENTION

In view of the above-mentioned limitations, the multi-resolver rotation angle sensor of the present invention includes a housing with a high precision structure, a terminal that connects to a resolver stator and that does not cause deformation or loosening of terminal pins from an associated stator insulator, and a connection structure between resolver stators and a signal output line that is not affected by thermal stress.

The housing is divided into two or more divisional housings, and one resolver is installed in each of the divisional housings for sensing a rotation angle at respective portions of a rotating member extending axially therethrough. The plurality of divisional housings are welded around axially oriented adjacent openings therein.

Regarding the terminal, lead lines of the stator windings are connected to the wiring of a pair of printed circuit substrates that are relaying substrates. One of the pair of printed circuit substrates includes a plurality of pins, as well as a reinforced substrate and a wiring lead portion through which the plurality of pins are fastened. Because the terminal pins are fastened to the printed circuit substrate, the printed circuits thereon are not easily deformed, and the terminal pins are not loosened, even at high temperatures.

Regarding the connection structure, a connection substrate is fastened to the housing for connecting respective lead lines of stator windings to an external signal output line or lines. The lead lines of the stator windings are connected to the connection substrate either directly or via flexible connecting lines such as magnet wires or flexible printed circuit substrates that extend from the relaying substrate to which the lead lines are connected. The lead lines, magnet wires or flexible printed circuit substrates provide absorb distortion and vibration generated by thermal stress to maintain the external electrical connection between the stator windings and the connection substrate.

BRIEF DESCRIPTION OF THE DRAWINGS

The accompanying figures, in which like reference numerals refer to identical or functionally similar elements throughout the separate views and which, together with the detailed description below, are incorporated in and form part of the specification, serve to further illustrate various embodiments and to explain various principles and advantages all in accordance with the present invention.

DETAILED DESCRIPTION OF THE PREFERRED EMBODIMENTS

The rotation angle sensor of the present invention will now be described in detail in accordance with the drawings. Illustration and description of components such as resolver rotors are omitted where not necessary for one skilled in the art to understand the present invention. The structure of the housing, the supporting structure of the terminal pins and the overall rotation angle sensor structure will be described in order.

Figures 1, 2B, 2C, 2D:
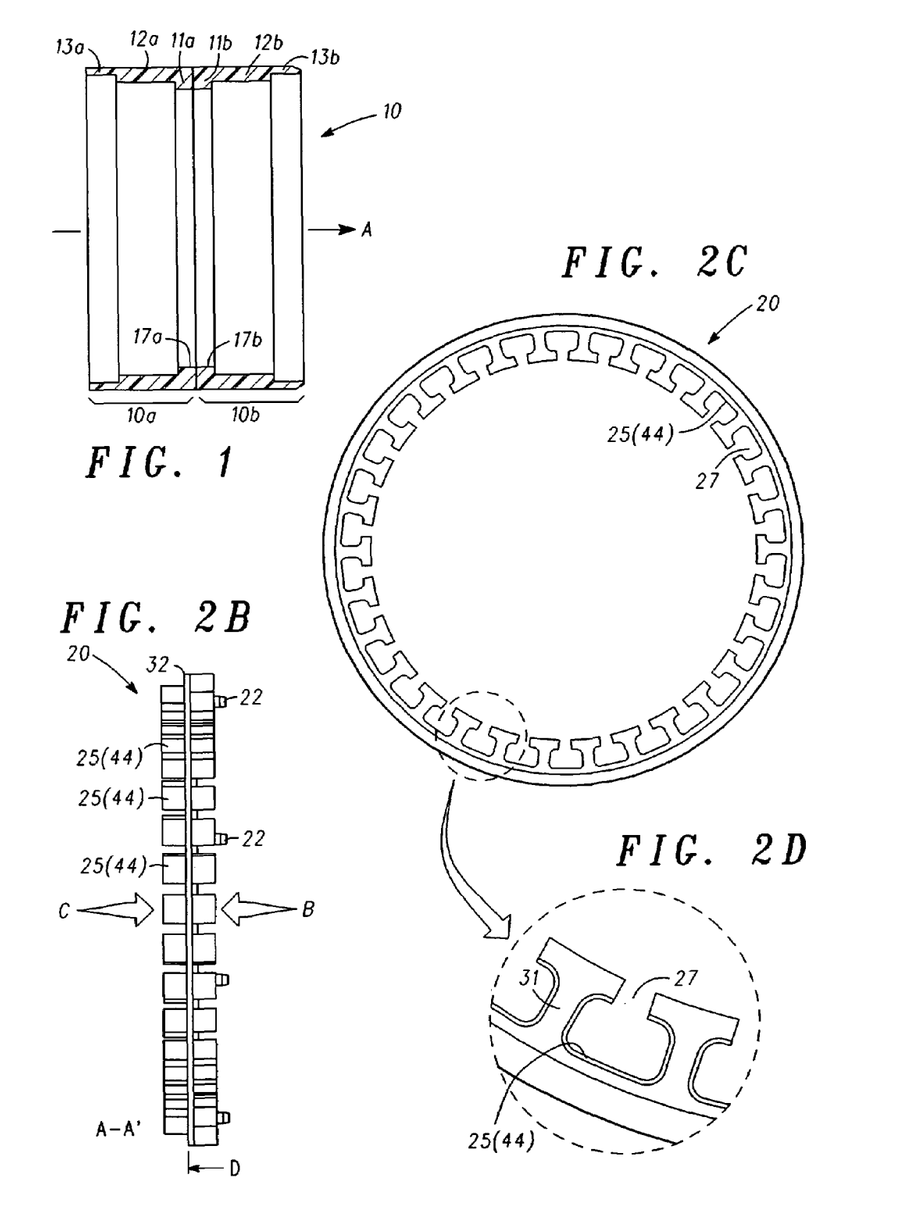
FIG. 1 is cross-sectional view in the axial direction of a housing for a multi-resolver rotation angle sensor according to one preferred embodiment of the present invention.
FIG. 2B is cross-sectional view of the insulator taken along line A–A' in FIG. 2A.
FIG. 2C is a side view of the insulator viewed from side C in FIG. 2B.
FIG. 2D is an enlarged view of the circled section of the insulator in FIG. 2C.

FIG. 1 is a cross-sectional view of the housing 10 of the multi-resolver rotation angle sensor of the present invention, with the arrow A defining the direction through which a rotating member (not shown; see torsion bar 103 in FIG. 1 for an example of such a rotating member) having a rotation angle to be sensed by the rotation angle sensor of the present invention extends through the housing 10. The housing 10 is formed from a stainless steel or an aluminum alloy and includes divisional housings 10a, 10b that are welded together by aligning and adjoining the respective opening edges along small diameter sections 11a, 11b thereof. The resolvers (not shown) contained in each of the divisional housings 10a, 10b are provided so that the respective resolver zero points (rotation reference points) are matched.

As discussed in more detail below, the divisional housings 10a, 10b can be divided at a location such as, for example, steps 17a, 17b similar to step 117 of the conventional housing shown in FIG. 5 in the vertical direction with respect to the arrangement of the resolvers contained therein. Therefore, manufacturing precision can be increased. In addition, defects can be detected when only one resolver is assembled inside one of the divisional housings 10a, 10b after the resolver has been assembled.

The divisional housings 10a, 10b are structured to each accommodate one resolver. Therefore, any number of divisional housings can be assembled to contain a like number of resolvers, so that the relative rotation angle of a corresponding number of detection points of a rotating member can be measured. The order in which the divisional housings are connected is determined by taking into account parameters such as, for example, the effect of noise on stator output windings (not shown).

The divisional housings 10a, 10b respectively include the aforementioned small diameter sections 11a, 11b, as well as medium diameter sections 12a, 12b and large diameter sections 13a, 13b. The small diameter sections 11a, 11b enable resolvers to be respectively positioned and separated within the divisional housings. Specifically, the small diameter sections 11a, 11b, when welded together around peripheries thereof, function as stoppers similar to the step 117 shown in FIG. 5. However, the open sections may be located anywhere in the divisional housings as long as the divisional housings 10a, 10b can be combined into the single integrated housing 10.

The medium diameter sections 12a, 12b are respectively located adjacent to the small diameter sections 11a, 11b, and are formed to accommodate resolver stators (not shown) in a manner such that the stators face one another. The large diameter sections 13a, 13b are for housing components other than stators such as, for example, non-contacting power source transformer windings (not shown) as required to prevent noise that is generated by such components from adversely affecting the rotation angle detection signal.

As described above, each of the divisional housings 10a, 10b can be individually inspected for defects, such as deformation, due to resolver installation prior to the divisional housings being welded together. Therefore, unlike conventional resolver housings, which cannot be inspected for defects until after being assembled, only non-defective divisional housings can be assembled, aligned and welded.

Figures 2A, 2E, 2F, 2G, 2H:
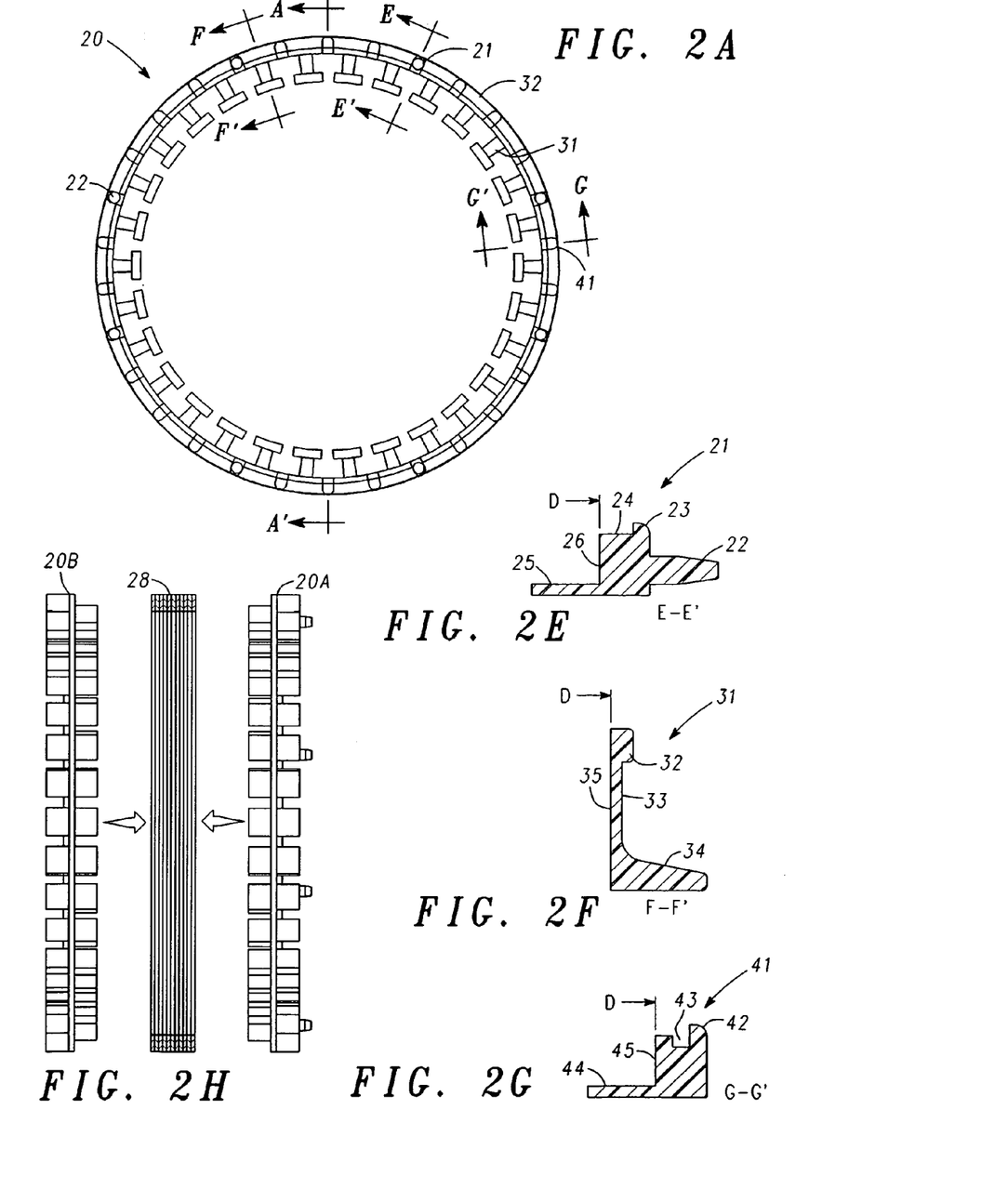
FIG. 2A shows an insulator for a resolver stator of the type utilized in the rotation angle sensor of the present invention.
FIG. 2E is a cross-sectional view taken along line E–E' in FIG. 2A and viewed in the direction of arrow D.
FIG. 2F is a cross-sectional view of the insulator taken along line F–F' in FIG. 2A.
FIG. 2G is a cross-sectional view of the insulator taken along line G–G' in FIG. 2A.
FIG. 2H is a side view of the assembly of insulators and an exemplary stator stack utilized in the rotation angle sensor of the present invention.

Referring now to FIGS. 2A–2H, the supporting structure of the terminal pins, and more specifically the connecting structure for the lead line of the resolvers contained in the divisional housings, 10a, 10b will be described. As shown in FIG. 2A and FIG. 2C, an insulator, also referred to as a stator insulator or insulator 20, hereinafter also referred to as an insulator, is ring-shaped. As shown in FIG. 2B, the insulator 20 includes projecting portions that project outwardly therefrom in both the right and left axial directions, represented by arrow B and arrow C, respectively, from a ring-shaped junction 32 that is located approximately in the center of the insulator 20. The insulator 20 is made of synthetic resin material having a thermal expansion rate of 0.00003 cm/° C., such as PBT glass (30%), with a magnetic cover 31 having the same shapes and numbers as the magnetic poles (not shown) of the stator yoke (not shown).

Referring to FIG. 2E, a substrate support 21 is shown in the cross sectional view taken along line E–E' in FIG. 2A and viewed in the planar direction indicated by the arrow D. The substrate support 21 includes a junction surface 26, which is located on the left hand side of the ring junction 32 in FIG. 2B, and which is the approximate center of the substrate support 21. Stator windings (not shown) cross over a crossing step 24, and a step 23 prevents detachment of the stator windings that cross over the crossing step 24. A supporter 22 projects in a tapering manner outwardly relative to the step 23 and the junction surface 26. A slot insulator 25 forms the lower edge of the junction surface 26.

FIG. 2F shows a cross-sectional view of the magnetic cover 31 taken along line F–F' in FIG. 2A. The magnetic cover 31 includes a ring-shaped connector 32, a concave coil winding portion 33 and a coil stopper 34. The coil stopper 34 forms the lower edge of the concavity defined by the magnetic cover 31 on the right side of the drawing relative to the junction surface 35 (corresponding to the junction surface 26 described above).

FIG. 2G is a cross-sectional view taken along line G–G' in FIG. 2A of the crossing portion 41. The crossing portion 41 is provided with a concave groove 43 in which the stator windings are hooked, and a step 42 for preventing windings from detaching, with the step 42 forming one lateral wall of the concave groove 43 on one side of the ring-shaped junction 32 (corresponding to the junction surface 26 and 35 described above). On the opposite side, a slot insulator 44 forms the lower edge of the junction surface 45, with the junction surface 45 corresponding a left-hand side of the ring-shaped connector 32 relative to FIG. 2B.

Figures 3A, 3B:
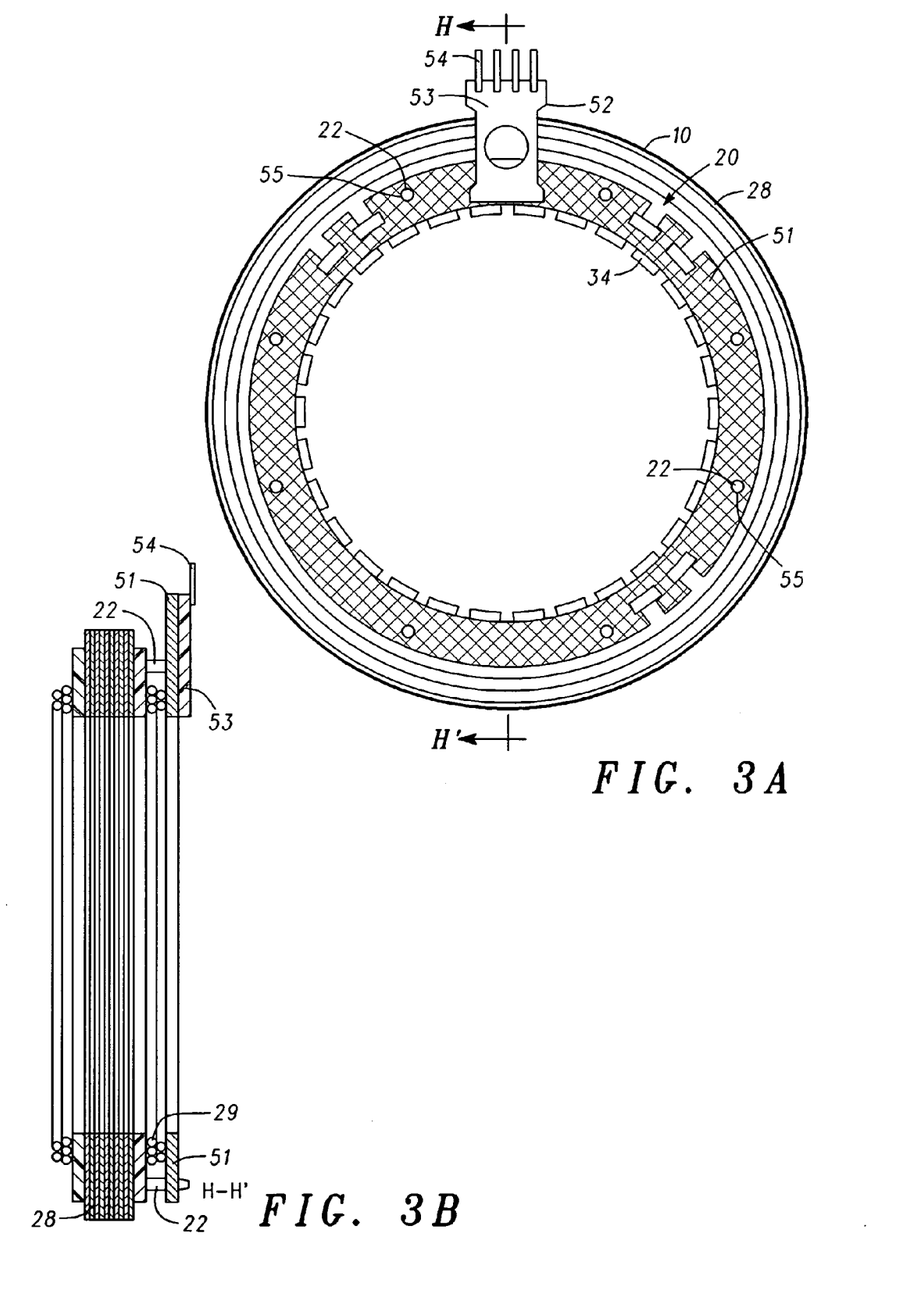
FIG. 3A shows an exemplary stator assembly that includes an insulator of the type shown in FIGS. 2A–2H.
FIG. 3B is a cross-sectional view of the stator assembly taken along line H–H' in FIG. 3A.

Supporters such as the exemplary supporters 22 in FIGS. 2B and 2E are provided to support a ring-shaped circuit substrate, such as the printed circuit substrate 51 shown in FIG. 3A. As shown in FIG. 2A, the supporters 22 are provided at locations corresponding to every second or third stator winding crossover portion 41 on the ring-shaped connector 32.

As shown in FIGS. 2C and 2D, the slot insulators 25, 44 on the left-hand side of the ring-shaped connector 32 are each formed in an approximate sideways square U-shape in order to penetrate into each slot, such as the exemplary slot 27. The slot insulators 25, 44 may be formed, in principle, in any shape as long as they adhere to the respective surfaces of the slots.

Referring now to FIG. 2H, insulators 20A, 20B are arranged on and mounted to both sides of a stator stack 28. The insulators 20A, 20B are arranged so that the slot insulators 25, 44 face the stator stack 28. The insulators 20A, 20B are inserted so that the slot insulators 25, 44 are inserted into the slots 27 of the stator stack 28 and fastened to the stator stack 28. When each of the magnetic poles of the stator assembly are temporarily assembled as described above, electric wires are coiled in order via crossing steps 24 and concave grooves 43.

The ends of the electric wires are connected to wiring on the stator coil side of the ring-shaped printed circuit substrate 51, also referred to as a relay substrate, shown in FIG. 3A. The printed circuit substrate 51 is provided with a projecting wiring lead portion 52 at one location. Except for the wiring lead portion 52, the printed circuit substrate 51 is formed in a ring shape that is approximate to the lateral side of the stator yoke. Holes 55 are defined in the printed circuit substrate 51 in which the supporters 22 of a corresponding one of the pair of insulators 20A, 20B are secured (represented generally by the insulator 20 in FIG. 3A).

A reinforced substrate 53 is mounted on the wiring lead portion 52. L-shaped pins 54 penetrate and fasten the wiring lead portion 52 and the reinforced substrate 53 and at the same time are connected to the wiring of the printed circuit substrate 51.

Figures 4A, 4B:
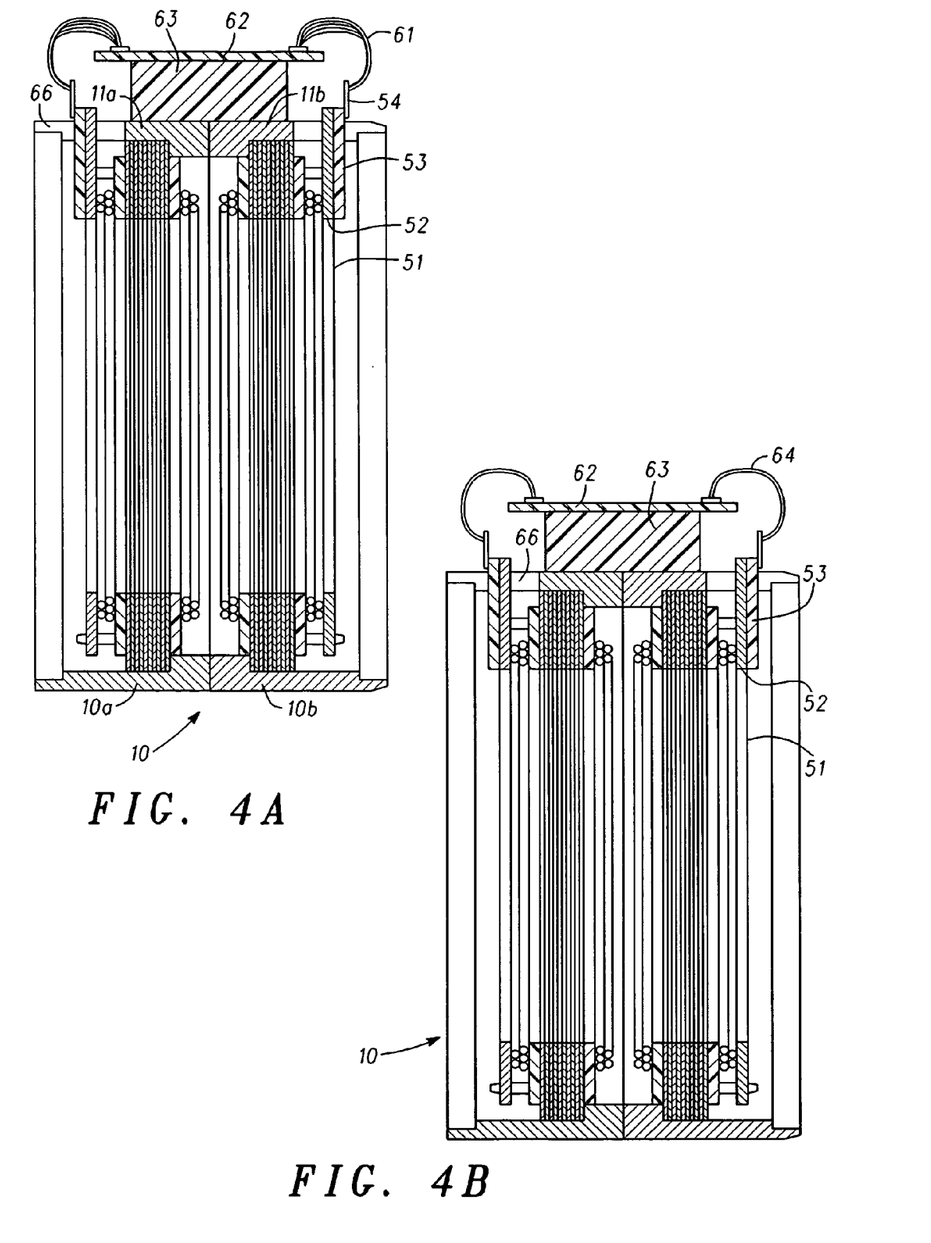
FIGS. 4A–4C are cross-sectional views of a two stator assembly connected in various configurations to a printed circuit substrate of the type shown in FIGS. 3A–3B and installed in the housing shown in FIG. 1.
Figure 4C:
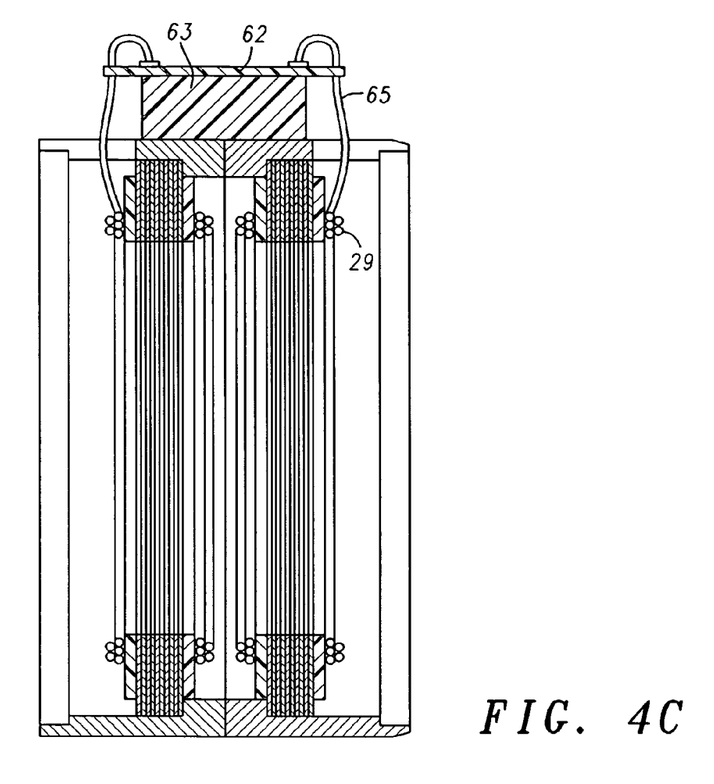

FIGS. 4A–4C are cross-sectional views in the axial direction of two stators each including the aforementioned printed circuit substrates installed in its housing, with illustration and description of the corresponding rotors being omitted.

More specifically, FIG. 4A shows printed circuit substrates 51 connected to a connecting substrate 62 by flexible printed circuit substrates 61, with each of the flexible printed circuit substrates 61 including a backlash. In FIG. 4A, each of the stators has two corresponding printed circuit substrates 51 that are positioned to face each other in each of the small diameter sections 11a, 11b of the respective divisional housings 10a, 10b and to contact the stator stack 28. The lead portion 52 and reinforced substrate 53 of each of the printed circuit substrates 51 are inserted through slits 66 located on the upper side of each of the respective divisional housings 10a, 10b.

On the housing 10, the printed circuit substrate 62 for the external, or signal output, line connection is fastened via a supporter 63. During assembly of the supporter 63 to the housing 10, a transformer winding (not shown) for providing electricity to the respective outsides of the ring-shaped printed circuit substrates 51 is provided as required.

Because the L-shaped pins 54 of the printed circuit substrates 51 and the connecting substrate 62 are connected by the flexible printed circuit substrate 61, heat distortion and vibration of the ring-shaped printed circuit substrates 51 is absorbed and attenuated by the flexible printed circuit substrate 61 and is not transferred to the connecting substrate 62.

FIG. 4B shows printed circuit substrates 51 connected to the connecting substrate 62 by flexible electric wire 64, with the flexible electric wire 64 including a backlash. The two-stator configuration shown in FIG. 4B is similar to that shown in FIG. 4A, except that the flexible electric wire 64 is used to connect the L-shaped pins 54 of the printed circuit substrates 51 and the connecting substrate 62 instead of the flexible printed circuit substrate 61 in FIG. 4A. Other structures of FIG. 4B are the same as those in FIG. 4A, and therefore the description thereof is omitted.

FIG. 4C is a cross-sectional showing lead lines 65 of stator coils being connected directly to the connecting substrate 62, with the lead lines 65 each including a backlash. The two-stator configuration shown in FIG. 4C is similar to those shown in FIGS. 4A and 4B except that the printed circuit substrates 51 are omitted so that the stator stacks 28 directly contact the small diameter sections 11a, 11b of each of the divisional housings 10a, 10b, and the respective ends of the stator coil lead lines 65 are directly connected to the wiring of the connecting substrate 62.

In addition to the aforementioned embodiments, additional connecting configurations for connecting the stator stacks 28 to the connecting substrate 62 may be utilized as long as the ends of the stator coil windings, or the pins 54 of the printed circuit substrates 51 connected to the ends of the stator coil windings, are connected to the wiring of the connecting substrate 62 for signal output line connection so that thermal distortion and vibration of the ring-shaped printed circuit substrates 51 are absorbed and attenuated and therefore are not transferred to the connecting substrate 62.

The above-described housing configuration of the rotation angle sensor of the present invention decreases the total length of each of the divisional housings and therefore increases manufacturing precision and reduces the manufacturing complexity. Also, as resolver components are assembled in separate divisional housings, separate testing of each of the individually housed resolvers can be performed, and the divisional housings welded, so that the final rotation angle sensor can be structured only with non-defective components. Also, when the resolvers in each of the divisional housings are aligned, all divisional housings are welded while the zero positions of each of the resolvers is mechanically or electrically aligned so that the resulting housing maintains an accurate zero position of each of the resolvers contained therein.

In addition, the rotation angle sensor of the present invention is structured so that insulators are not provided on the top and bottom of each stator stack, and terminal pins are not hammered into these insulators. As a result, deformation or cracks of the insulator and deformation of the pins is prevented. Each of the stators in the multi-resolver rotation angle sensor of the present invention is insulated by insulators with supporters on both sides of the stator stack. Once the stator windings are coiled, the lead lines of the stator windings are connected to the wiring of printed circuit substrates, and the printed circuit substrates are supported by supporters projecting from the insulators. Therefore, terminal pins are not required for support, and terminal pin installation problems in prior art rotation angle sensors can be avoided.

Because the terminal pins are fastened to the printed circuit substrates, the printed circuits thereon are not easily deformed, and the terminal pins are not loosened, even at high temperatures.

The connection between the printed circuit substrate and the connecting substrate for establishing a signal line connection in each of the divisional housings may be established by a flexible connecting line that absorbs distortion and vibration generated by thermal stress to maintain the electrical connection. In addition, because a printed circuit substrate is used for the lead line connection, the amount of backlash of the lead line from the coil winding to the printed circuit substrate can be appropriately gauged to improve product reliability and extend product life.

The disclosure is intended to explain how to fashion and use various embodiments in accordance with the invention rather than to limit the true, intended and fair scope and spirit thereof. The forgoing description is not intended to be exhaustive or to limit the invention to the precise form disclosed. Modifications or variations are possible in light of the above teachings. The embodiments were chosen and described to provide the best illustration of the principles of the invention and its practical application, and to enable one of ordinary skill in the art to utilize the invention in various embodiments and with various modifications as are suited to the particular use contemplated. All such modifications and variations are within the scope of the invention as determined by the appended claims, as may be amended during the pendency of this application for patent, and all equivalents thereof, when interpreted in accordance with the breadth to which they are fairly, legally, and equitably entitled.

What is claimed is:

1. A rotation angle sensor comprising:
a housing formed from a plurality of adjoined and axially aligned divisional housings; and
a plurality of resolvers respectively contained in the plurality of divisional housings for sensing a rotation angle at respective portions of a rotating member extending axially through the plurality of adjoined divisional housings, wherein each of the resolvers includes a stator, the stator comprising:
a ring-shaped stator stack; and
insulators located on both sides of the ring-shaped stator stack, the insulators being ring-shaped to correspond to a shape of the ring-shaped stator stack, and including a plurality of supporters projecting orthogonally from respective surfaces thereof.

2. The rotation angle sensor of claim 1, wherein the plurality of divisional housings are adjoined and axially aligned so that stators of the plurality of resolvers face one another.

3. The rotation angle sensor of claim 1, further comprising printed circuit substrates fastened to the plurality of supporters and being connected to respective lead lines of windings of the stator of each of the resolvers.

4. The rotation angle sensor of claim 3, further comprising pins secured to the printed circuit substrates and being connected to both the respective lead lines of the stator windings and to an external signal output line.

5. The rotation angle sensor of claim 4, wherein the pins are connected to the external signal output line through flexible connection lines.

6. The rotation angle sensor of claim 5, wherein the flexible connection lines each comprise one of a flexible printed circuit substrate and a flexible wire.

7. The rotation angle sensor of claim 5, wherein each of the flexible connection lines includes a backlash.

8. The rotation angle sensor of claim 1, wherein each of the plurality of adjoined divisional housings comprises a small diameter section, a medium diameter section, and a large diameter section, the small diameter section including a stepped portion, and the medium diameter section including a stator of the one of the plurality of resolvers.

9. A rotation angle sensor comprising:
a housing formed from a plurality of adjoined and axially aligned divisional housings; and
a plurality of resolvers respectively contained in the divisional housings for sensing a rotation angle at respective portions of a rotating member extending axially through the plurality of adjoined divisional housings wherein one of the resolvers is an input resolver and one of the resolvers is an output resolver, and the rotation angle sensor detects relative rotation between the input resolver and the output resolver.

10. The rotation angle sensor of claim 9, wherein the plurality of divisional housings are adjoined and axially aligned so that stators of the plurality of resolvers face one another.

11. The rotation angle sensor of claim 9, wherein each of the resolvers includes a stator, the stator comprising:
a ring-shaped stator stack; and
insulators located on both sides of the ring-shaped stator stack, the insulators being ring-shaped to correspond to a shape of the ring-shaped stator stack, and including a plurality of supporters projecting orthogonally from respective surfaces thereof.

12. The rotation angle sensor of claim 9, further comprising printed circuit substrates fastened to the plurality of supporters and being connected to respective lead lines of windings of the stator of each of the resolvers.

13. The rotation angle sensor of claim 12, further comprising pins secured to the printed circuit substrates and being connected to both the respective lead lines of the stator windings and to an external signal output line.

14. The rotation angle sensor of claim 13, wherein the pins are connected to the external signal output line through flexible connection lines.

15. The rotation angle sensor of claim 14, wherein the flexible connection line each comprise one of a flexible printed circuit substrate and a flexible wire.

16. The rotation angle sensor of claim 14, wherein each of the flexible connection lines includes a backlash.

17. The rotation angle sensor of claim 9, wherein each of the plurality of adjoined divisional housings comprises a small diameter section, a medium diameter section, and a large diameter section, the small diameter section including a stepped portion, and the medium diameter section including a stator of the one of the resolvers.

* * * * *

UNITED STATES PATENT AND TRADEMARK OFFICE
CERTIFICATE OF CORRECTION

| | |
|---|---|
| PATENT NO. | : 7,197,951 B2 |
| APPLICATION NO. | : 10/897439 |
| DATED | : April 3, 2007 |
| INVENTOR(S) | : Koyama et al. |

It is certified that error appears in the above-identified patent and that said Letters Patent is hereby corrected as shown below:

Column 10, line 42-44, delete claim 15, and insert claim 15 as follows:

15. The rotation angle sensor of claim 14, wherein the flexible connection lines each comprise one of a flexible printed circuit substrate and a flexible wire.

Signed and Sealed this

Fifth Day of June, 2007

JON W. DUDAS
*Director of the United States Patent and Trademark Office*